Feb. 1, 1966 E. P. VILKAS 3,233,076
WELDING CONTROL SYSTEM
Filed Sept. 21, 1964 4 Sheets-Sheet 1

FIG. 1

INVENTOR.
Eugene P. Vilkas
BY
Mueller & Aichele
Attys.

Feb. 1, 1966  E. P. VILKAS  3,233,076
WELDING CONTROL SYSTEM
Filed Sept. 21, 1964  4 Sheets-Sheet 4

FIG. 5

INVENTOR
EUGENE P. VILKAS
BY
Mueller + Aichele
Attys.

United States Patent Office 3,233,076
Patented Feb. 1, 1966

3,233,076
WELDING CONTROL SYSTEM
Eugene P. Vilkas, Chicago, Ill., assignor to Welding Research, Inc., Chicago, Ill., a corporation of Illinois
Filed Sept. 21, 1964, Ser. No. 400,627
20 Claims. (Cl. 219—131)

This invention relates generally to automatically welding control systems, and more particularly to a system for controlling arc welding apparatus having a non-consumable electrode so that the weld penetration is held substantially constant. This application is a continuation in part of my application Serial No. 340,099, filed January 24, 1964, now abandoned.

In automatic arc welding systems, it is desirable to control the heat input at the weld in progress, to thereby provide constant weld penetration as required for reliable welds. The main factors controlling heat input are the welding current applied through the arc, the voltage across the welding arc, and the welding speed or speed at which the arc is moved along a workpiece, which determines the heat per unit of distance. The weld penetration also depends on the workpiece itself, as irregularities in the workpiece and in the fit up between pieces being welded affects the heat developed and the dissipation of heat from the weld. To hold the weld penetration constant it is, therefore, necessary to compensate one or more of the factors; that is, welding current, welding voltage or welding speed, for variations in the workpiece and for fit up between pieces. An automatic system which compensates for irregularities in the workpiece to provide constant weld penetration is, therefore, highly desirable.

In prior automatic arc welding systems having a non-consumable electrode, the arc voltage between the electrode and the workpiece was measured and compared with a preset reference voltage. The error, if any, was amplified and fed to a motor controlled welding head to adjust the electrode holding device toward and away from the workpiece to thereby maintain constant arc voltage. In such automatic arc welding systems, weld penetration was maintained by placing backing material (copper, stainless steel, weld metal, asbestos, carbon, granular flux, etc.) to back up the joint during welding to facilitate obtaining a uniform underbead geometry. Therefore, the uniformity of welds produced under production conditions has, in the past, depended extensively upon the skill of the operator, and upon accurate joint fitup and tooling. The tooling required a grooved backing material and accurate edge clamping, but for very large structures this type of tooling is extremely expensive and the setup procedure is very time consuming.

Further, joint backing material will not be capable of providing uniform heat distribution over the full length of the weld for very large structures. Also, it has been found that maintaining constant the basic welding parameters (welding current, arc voltage, welding speed, and filler wire feed rate) is not sufficient to insure reliable and reproducible for welds in large structures without a highly skilled operator in constant attendance. Moreover, it does not appear that a skilled operator could be relied upon to make adjustments of welding parameters when welding long joints which require concentrated attention for a period of one hour or more.

An object of the present invention is to provide an automatic welding system which senses changes in weld penetration and automatically corrects for such changes.

Another object of the invention is to provide an automatic welding system wherein weld penetration is controlled without the attention of an operator.

A further object of the invention is to provide a system which senses a change in position of an arc voltage controlled electrode with respect to a workpiece and compensates the current, voltage reference and/or welding speed so that the electrode returns to a position providing the desired weld penetration.

A feature of the invention is the provision of a welding system in which the welding electrode is automatically positioned with respect to a workpiece, and which includes apparatus for sensing the position of the electrode to thereby measure the weld penetration. The system automatically changes the welding current, arc voltage and/or welding speed for compensating the electrode position to hold the weld penetration substantially constant.

Another feature of the invention is the provision of a welding control system wherein the magnitude of the welding current is initially controlled by a constant reference voltage and is controlled after a time delay in accordance with an error signal responsive to the change in the electrode position, to compensate for the change in position so that the electrode can be returned to the normal position. In an alternate embodiment, the electrode position is initially controlled by a fixed reference voltage, and later in accordance with the position error signal.

A further feature of the invention is the provision of an automatic welding system including mechanical apparatus for controlling the position of the welding electrode, and distance measuring apparatus coupled to the welding electrode to provide an error signal in response to the distance of the electrode from the workpiece for compensating the system so that the electrode can return to its normal position. The control system can change the welding current to thereby return the electrode to its normal position, or change the reference arc voltage which controls the electrode position, or change the welding speed, to compensate the electrode positioning in accordance with the positioning error signal. Two or more of these controls can be used together when desired.

Still another feature of the invention is the provision of a welding current system wherein the magnitude of the welding current is controlled in accordance with an error signal responsive to the change in the position of the welding electrode, and wherein the change in welding current produces a further control to change the position of the electrode.

In practicing this invention, there is porvided a welding system having an automatic welding head which supports a welding torch having a non-consumable electrode in a position adjacent to a workpiece. The welding torch may also apply an inert gas to the welding arc and molten metal. The electrode is positioned in the automatic head by a motor operated by a control system. A welding current source is connected between the welding electrode and the workpiece. The welding arc between the electrode and workpiece may be ignited by means of a high frequency oscillator included in the welding current source. The voltage between the electrode and the workpiece is used to control the electrode position with respect to the weld. A time delay circuit is actuated by a current sensing circuit, and after a given time delay actuates distance transducer apparatus including a mechanical follower device in contact with the surface of the workpiece, and a distance measuring pick up supported by the torch above this follower device. When the distance between the electrode and the workpiece gets longer, the transducer-produced signal increases, and when the distance gets shorter, the transducer-produced signal decreases. The transducer-produced signal is balanced against a distance reference voltage to provide an error signal for controlling the output current of the welding current source. This error signal operates after the given time delay to automatically control the welding current so that the position of the electrode with respect to the workpiece remains constant.

In an alternate embodiment of the invention, the error signal produced by the distance measuring transducer is used to compensate the voltage which forms the reference for the arc voltage welding electrode positioning system. The electrode is automatically positioned in accordance with the compensated voltage to provide constant weld penetration. In a third embodiment of the invention, the welding current is controlled as set forth above, and the change in welding current provides an additional control which changes the position of the electrode so that the arc length increases as the welding current decreases. In a further embodiment of the invention, the error signal is applied to a motor control system to control the welding speed to provide the desired weld penetration.

Figure 1:
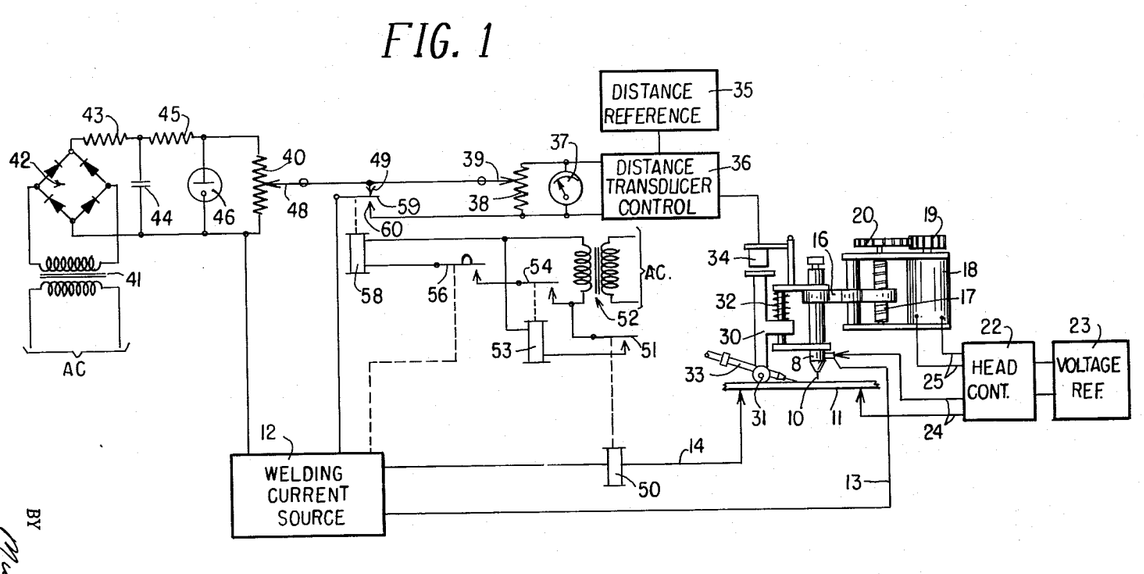
FIG. 1 is a schematic diagram of a system in accordance with the invention wherein the welding current is controlled to hold the weld penetration constant.

Referring now to the drawings, in FIG. 1 there is shown a welding system including an automatic welding head having a welding torch 8 including a welding electrode 10. The welding head holds the torch so that the welding electrode 10 is positioned with respect to a workpiece 11 to produce an arc weld thereon. The workpiece may include a number of pieces which are being welded together. A welding current source 12 is provided for producing an arc between the electrode 10 and the workpiece 11. This is connected through conductor 13 to the electrode 10, and through conductor 14 to the workpiece 11. The welding current source 12 may also include a high frequency oscillator for applying high frequency current between the electrode 10 and the workpiece 11 to initiate the welding arc in a known manner. The torch 8 may apply an inert gas about the electrode 10 in a known manner.

The welding electrode 10 is supported in the welding head by arm 16 through which threaded shaft 17 extends. Shaft 17 is driven by motor 18 through gears 19 and 20. The motor 18 therefore can drive the threaded shaft 17 to cause the arm 16 to move therealong, so that the position of the electrode 10 with respect to the workpiece 11 is changed.

The motor 18 may be controlled by a servo head control system 22 for positioning the electrode 10 so that the voltage between the electrode 10 and the workpiece 11 remains constant. A voltage set by the reference voltage unit 23 serves as the reference for the electrode position. Conductors 24 are connected to the workpiece and the electrode to apply the voltage therebetween to the servo system 22. Conductors 25 apply energizing current from the system 22 to the motor 18. The servo system controls the position of electrode 10 so that the voltage between the electrode and the workpiece remains substantially constant at a value related to the preset reference voltage provided by the unit 23. This system for positioning the electrode to hold the arc voltage constant is known in the art.

In order to maintain constant the weld penetration produced by the arc between the electrode 10 and the workpiece 11, it is necessary that the electrode 10 be positioned at a substantially fixed distance from workpiece 11. To accomplish this, a follower member 30 is supported from the torch 8 and has a roller 31 engaging the workpiece 11. The follower 30 is biased by action of spring 32 so that the roller 31 presses against the workpiece. When the torch 8 is moved with respect to the workpiece, the follower 30 will follow the workpiece and move with respect to the torch 8.

The follower 30 may support a filler wire guide 33 which supports a filler wire to add metal to the weld. As the follower 30 is held in engagement with the workpiece, the guide 33 supported thereon is also held in fixed position with the workpiece and the weld thereon.

For sensing the movement of the follower 30 with respect to the torch 8, a distance measuring system is provided including pick up 34, distance reference unit 35 and distance transducer control 36. These elements may be in accordance with the description of Sommeria Patent No. 2,971,079 assigned to Welding Research, Inc., assignee of the present invention. The pick up 34 of the distance measuring system is supported in fixed position with respect to the torch 8. When the follower 30 moves with respect to the torch, it also moves with respect to pick up 34, and the pick up produces an output voltage which varies with the variation in distance. The output voltage pick up from 34 is compared with a reference voltage applied by the distance reference unit 35 to the distance transducer control 36. This produces an error voltage which is developed across potentiometer 38 and indicated by meter 37. The movable tap 39 of potentiometer 38 can be set to derive an error signal of the desired level, which is a measure of the distance of torch 8 from the workpiece, as compared to the reference distance which has been preset in the reference element 35.

The welding current source 12 is of the type in which the welding current supplied varies directly with a control voltage applied to the source. Such welding control sources are manufactured by Sciaky Bros., Inc., Chicago, Illinois. In the system of FIG. 1, a control voltage is applied to the welding current source 12 from potentiometer 40. Voltage from a standard A.C. source is applied through transformer 41 to rectifier bridge 42 which provides a direct current voltage. The rectifier voltage is applied to the filter including resistor 43 and capacitor 44, and through resistor 45 to the voltage regulator tube 46. A constant voltage is developed across the voltage regulator tube 46 and this is applied across potentiometer 40. The movable arm 48 on potentiometer 40 can be set to apply a preselected voltage through contacts 49 and 59 to the welding current source 12.

To provide control of the welding current from the distance transducer control 36, a circuit is provided including a current sensing relay 50 in the lead 14 from the welding current source 12. This relay includes contacts 51 which close when welding current is supplied through lead 14 and complete the circuit from the standard A.C. source through transformer 52 to relay 53. Relay 53 is a time delay relay which closes contact 54 thereof after a predetermined time interval. Contact 54 applies current from transformer 52 to relay 58 through the on-off switch 56. The switch 56 may be coupled to a switch for energizing the welding current source 12. Relay 58 operates contact 59 thereof to open the connection from contact 49 and establish a connection to contact 60.

When contact 59 of relay 58 engages contact 60, the voltage across the lower portion of potentiometer 40 is added to the voltage across the lower portion of the potentiometer 38 to provide a control voltage for the welding current source 12. That is, the error voltage produced by the distance transducer control 36 is added to the reference voltage produced by the setting of the arm 48 of the potentiometer 40. The level of the error voltage can be determined by the setting of the arm 39 of potentiometer 38. Therefore, after the welding system is in operation, the welding current is controlled by the error voltage from the distance transducer control.

Considering now the operation of the system of FIG. 1, when the electrode positioning head control system 22 causes the torch 8 to move away from the workpiece 11 in order to produce the desired arc voltage between the electrode 10 and the workpiece 11, the follower 31 will move away from pick up 34 so that the signal therefrom will differ from the reference signal and produce an error signal. This error signal is applied as a voltage to the welding current source to increase the current applied by this source. This increase in current will increase the penetration of the welding arc between the electrode 10 and the workpiece 11 so that the welding torch will move toward the workpiece. This will tend to return the torch 8 to its original position as is required to hold the penetration of the weld constant.

Figure 2:
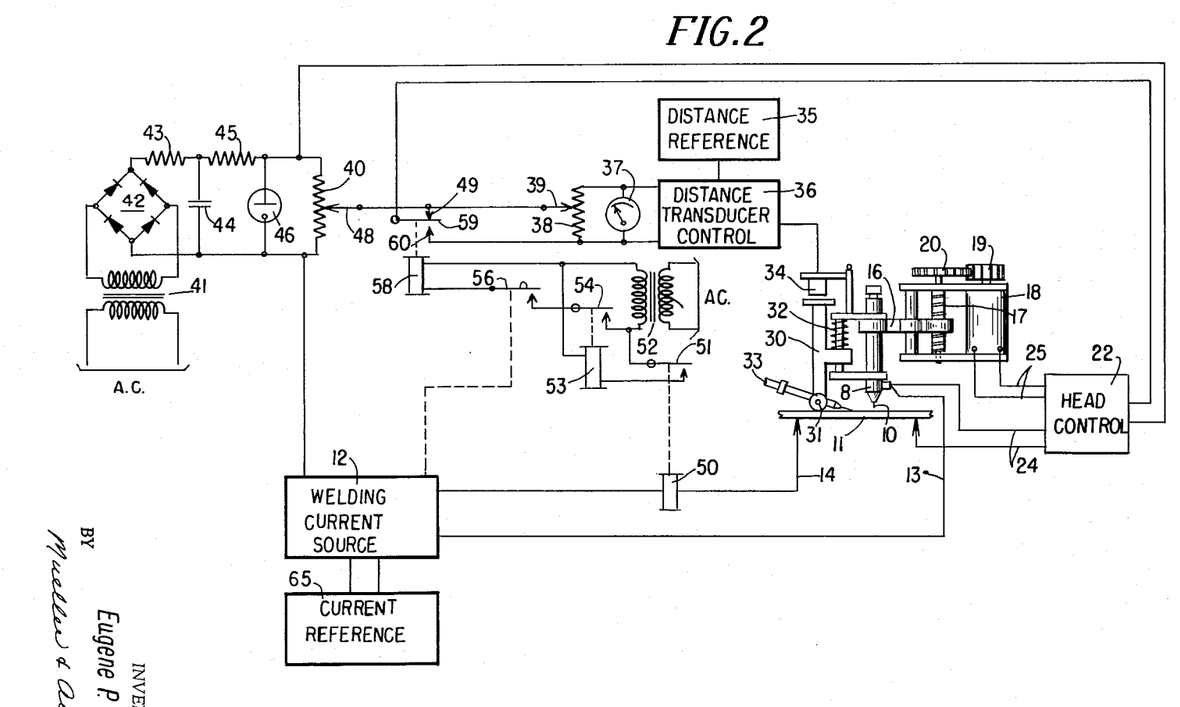
FIG. 2 is a schematic diagram of an alternate system in accordance with the invention in which the electrode position is compensated by changing the reference arc voltage.

FIG. 2 illustrates an alternate embodiment of the invention which has generally the same components as the system of FIG. 1, and these are given the same reference numerals. The welding source 12, however, is not controlled by the distance transducer control 36, but by current reference unit 65 which provides a constant control voltage to the welding current source. The current reference unit 65 can be set to the desired control voltage which will provide the level of welding current required for a particular application.

The head control servo system 22 for controlling the motor 18 which positions the welding electrode 10 is not controlled from a constant voltage reference as in FIG. 1, but from a voltage reference which includes the error signal produced by the distance transducer control 36. It will be apparent from FIG. 2 that the voltage appearing across the upper part of potentiometer 40 is applied through contacts 49 and 59 to the head control system 22. The movable arm 48 on potentiometer 40 can be set to provide the desired voltage level for the system at starting.

After current is applied to the welding electrode 10 and the time delay relay 53 operates to close contacts 54 thereof, relay 58 is energized and contact 59 moves from contact 49 and engages contact 60, so that the voltage across the lower part of potentiometer 38 is added to the reference voltage from potentiometer 40 for controlling the servo system 22. Accordingly, the error signal resulting from the position signal produced by pick up 34 becomes a part of the control voltage for the servo system 22. As the automatic welding head moves the torch 8 with respect to a workpiece 11, the follower 30 will move with respect to the pick up 34 to provide a position voltage which differs from the reference voltage produced by the unit 35, so that an error voltage will appear across potentiometer 38. Movable tap 39 of this potentiometer is set to add a desired portion of the error voltage to the fixed control voltage across potentiometer 40. These voltages operate together to provide the reference voltage for the head control system 22, and the arc voltage is related to this reference voltage to control the position of the torch 8. The position of the electrode is therefore compensated by the error voltage so that the weld penetration is held substantially constant.

Figures 3, 4:
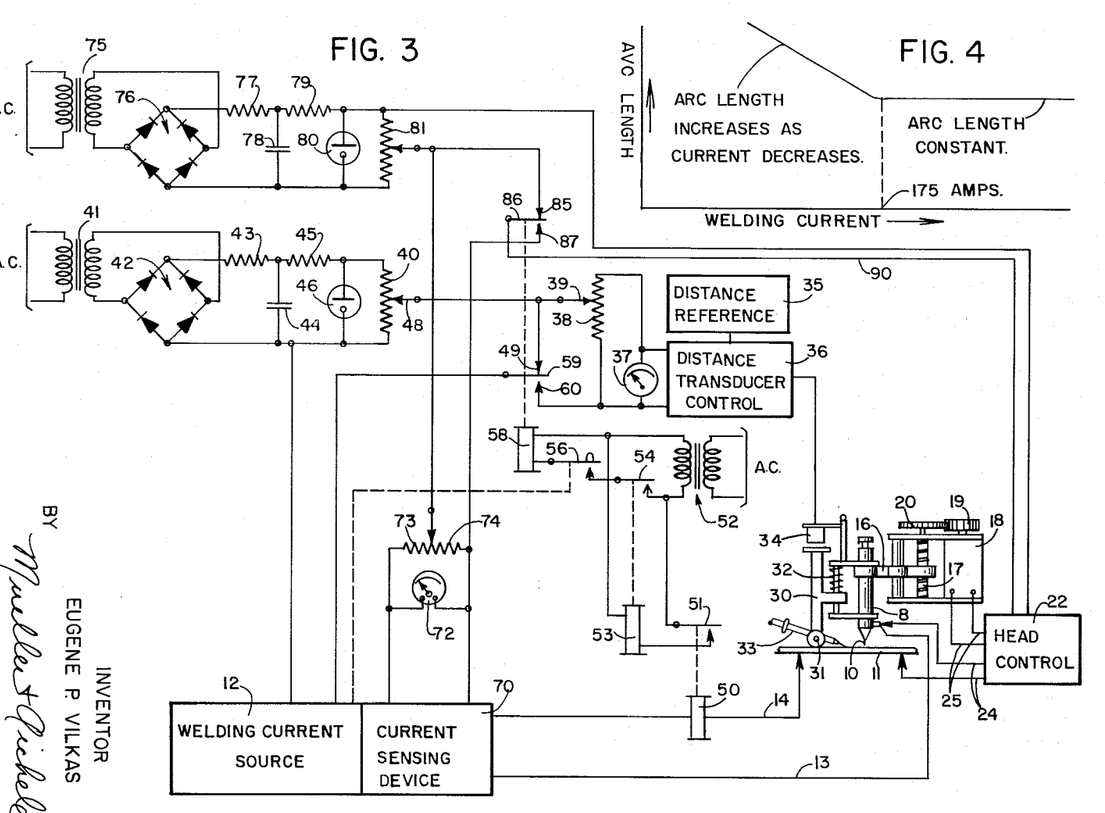
FIG. 3 is a schematic diagram of a system in accordance with FIG. 1 including a further control of the electrode position.
FIG. 4 is a chart illustrating the change in arc length required at low welding current settings.

In FIG. 3 there is shown a further embodiment of the invention wherein the welding current is controlled in accordance with the electrode position as in FIG. 1. In the system of FIG. 3 the position of the welding electrode is also controlled. The elements which are the same as those in FIG. 1 are given the same reference numerals. The system controls the welding current applied from the source 12 to the welding electrode 8 in accordance with the position of the electrode with respect to the workpiece 11, as described in connection with FIG. 1.

In the system of FIG. 3, a current sensing device 70 is connected to the welding current source 12 to sense the welding current supplied by the source to the electrode 8 and the workpiece 11. This produces a control voltage proportional to the welding current which is applied across meter 72 and potentiometer 73. The voltage derived from potentiometer 73 is combined with a reference voltage produced by a rectifier regulator system similar to that formed by the components 41 to 46. This system includes transformer 75 connected to the A.C. source which applies input current to the rectifier bridge 76. The direct current output of the rectifier bridge is filtered by resistor 77 and capacitor 78, and is applied through resistor 79 to the voltage regulator tube 80. This provides a regulated voltage across potentiometer 81.

The voltage at the movable tap on potentiometer 81 is applied through contacts 85 and 86 of relay 58 to conductor 90 connected to the head control 22. This provides a reference voltage to the head control, similar to that provided by the voltage reference 23 of FIG. 1. Until the relay 58 operates, this is a fixed reference voltage controlled by the position of the tap on potentiometer 81.

When the relay 59 operates, the contact 86 is pulled away from contact 85 and engages contact 87. This adds the voltage across the portion 74 of potentiometer 73 to the voltage across the upper portion of potentiometer 81, and applies the combined voltage to the conductor 90. The potential on conductor 90 controls the position of the welding electrode through the head control system 22 to provide the desired electrode position. The potential on conductor 90 changes with the change in welding current, as represented by the voltage across the portion 74 of potentiometer 73.

The system of FIG. 3 has been found to provide improved operation when welding at low current settings. In order to provide constant weld penetration with constant arc voltage and at low welding currents, it is necessary that the arc length increase as the welding current decreases. This action is illustrated in FIG. 4 wherein the arc length for constant weld penetration is illustrated by the curve. In one example, the bend in the curve occurs at 175 amperes. Above this value the arc length remains constant for constant weld penetration. However, below 175 amperes it is desirable that the arc length vary inversely with current to maintain constant weld penetration at constant arc voltage. Accordingly, the system of FIG. 3 can be used to provide such operation.

Figure 5:
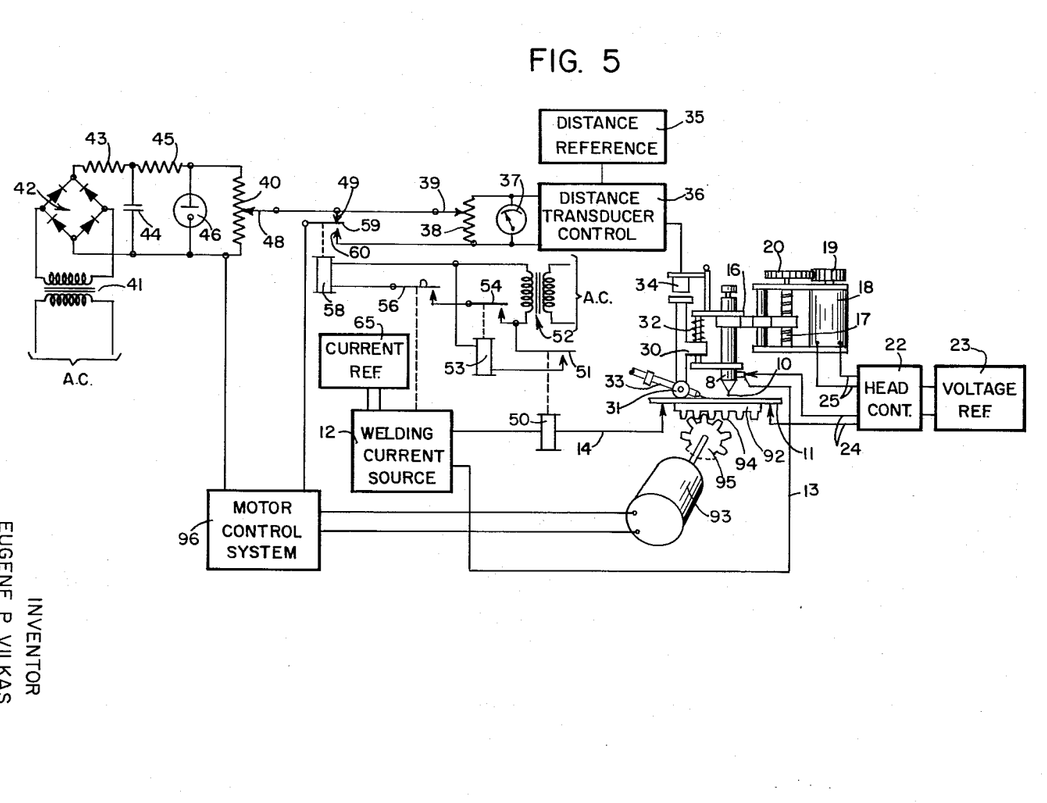
FIG. 5 is a diagram of a system in which the welding speed is controlled.

FIG. 5 illustrates an embodiment of the invention which has generally the same components as the systems of FIGS. 1 and 2, and wherein the weld penetration is controlled by controlling the speed of movement of the workpiece with respect to the welding torch. It is obvious that during welding either the torch or the workpiece can be moved, and in FIG. 5 a system is illustrated wherein the workpiece is moved. In the system of FIG. 5 the workpiece 11 is supported on a movable table 92. The table is moved by a motor 93 and can be coupled thereto in any known way, as by a rack 94 at the bottom of the table engaged by a gear wheel 95 driven by the motor 93. The speed of motor 93 is controlled by motor control system 96, which controls the speed in accordance with a control voltage applied thereto. Motor control systems suitable for this use are well known in the art. The control voltage from the distance transducer 36 is applied through movable contact 59 of the relay 58 to the motor control system 96.

The system of FIG. 5 operates in the same way as the system of FIG. 1, except the control voltage controls the speed of relative movement between the workpiece and the electrode to thereby control the welding speed, rather than the welding current as in the system of FIG. 1. In the system of FIG. 5, the welding current source 12 is controlled by a current reference 65 which may provide a constant reference as in the system of FIG. 2. The head control 22 in FIG. 5 is controlled by the voltage reference device 23, which may provide a constant voltage reference, as in the system of FIG. 1. By controlling the speed of the motor 93, the welding speed is controlled, and as previously stated this controls the weld penetration.

It will be apparent that instead of controlling only one of the factors which control weld penetration, as shown in each of the FIGURES of 1, 2 and 5, a system may combine features of these three systems and control two or more of the factors. That is, the welding current, the voltage reference for controlling the electrode position, and the welding speed can all be controlled, or any two of these factors can be controlled. The same control voltage can be applied to two or more of these three controls. FIG. 3 illustrates a system wherein both the welding current and the reference for the welding head are controlled to provide the desired weld penetration.

It is therefore seen that the invention provides an automatic welding control system which causes constant weld penetration by controlling the welding current, and/or the reference voltage for positioning of the torch, and/or the welding speed. As previously stated, these are the three main factors controlling weld penetration, and control of one or more of these factors is effective to provide the required weld penetration control. The welding current, the reference voltage for the automatic welding head and the welding speed can all be controlled by the error signal, or any two can be controlled in the event that one of these controls acting alone is not sufficient to provide the required accuracy in a particular application. The systems described have been found to be highly effective to provide automatic control of weld penetration.

I claim:

1. A welding control system including in combination, a welding electrode for producing a welding arc with a workpiece, current supply means for producing welding current and including first control means for controlling the welding current in accordance with the voltage applied thereto, conductor means for connecting said current supply means to said electrode and to the workpiece for applying welding current through the welding arc therebetween, automatic support means for said electrode for positioning the same with respect to the workpiece, said automatic support means including motor means for moving said electrode and second control means for operating said motor means in accordance with the voltage applied thereto, position sensing means responsive to the distance of the electrode from the workpiece for providing a controlling voltage, and circuit means coupling said sensing means to one of said control means for applying said controlling voltage thereto.

2. A welding control system including in combination, a welding electrode for producing a welding arc between said electrode and a workpiece, current supply means for producing welding current and including first control means for controlling the welding current in accordance with a control voltage applied to said first control means, conductor means for connecting said current supply means to said electrode and to the workpiece for applying welding current through the arc therebetween, automatic support means for said electrode for positioning the same with respect to the workpiece, said automatic support means including second control means for controlling the position of said electrode in accordance with the voltage across the welding arc and a control voltage applied to said second control means, position sensing means coupled to said electrode and to the workpiece and responsive to the distance of the electrode from the workpiece for providing a controlling voltage, circuit means coupling said sensing means to one of said control means for applying said controlling voltage thereto, and reference means for applying a control voltage to the other one of said control means.

3. A welding control system including in combination, a welding electrode for producing a welding arc between said electrode and a workpiece, current supply means for producing welding current and including first control means for controlling the welding current in accordance with a control voltage applied to said first control means, conductor means for connecting said current supply means to said electrode and to the workpiece for applying welding current through the arc therebetween, automatic support means for said electrode for positioning the same with respect to the workpiece, said automatic support means including second control means for controlling the position of said electrode in accordance with the voltage across the welding arc and a control voltage applied to said second control means, position sensing means coupled to said electrode and to the workpiece for producing a position voltage which varies with the distance of the electrode from the workpiece, said sensing means producing an error voltage in response to variation of said position voltage from a reference voltage, circuit means coupling said sensing means to one of said control means for applying said error voltage thereto, and reference means for applying a control voltage to the other one of said control means.

4. A welding control system including in combination, a welding torch having an electrode for producing a welding arc between said electrode and a workpiece, current supply means for producing welding current and including first control means for controlling the welding current in accordance with a control voltage applied to said first control means, conductor means for connecting said current supply means to said electrode and to the workpiece for applying welding current through the arc therebetween, automatic support means for said welding torch for positioning said electrode with respect to the workpiece, said automatic support means including second control means for controlling the position of said electrode in accordance with the voltage across the welding arc and a control voltage applied to said second control means, position sensing means including follower means movably supported on said welding torch and having a portion held in engagement with the workpiece, pick up means coupled to said follower means for producing a position voltage which varies with the distance of the electrode from the workpiece, and transducer means producing an error voltage in response to variation of said position voltage from a reference voltage, circuit means coupling said sensing means to one of said control means for applying said error voltage thereto, and reference means for applying a control voltage to the other one of said control means.

5. A welding control system including in combination, a welding electrode for producing an arc with a workpiece, support means for said electrode for positioning the same with respect to the workpiece, sensing means coupled to said electrode and responsive to the distance of the electrode from the workpiece for producing a controlling voltage, current supply means for producing current of a value which varies with the control voltage applied thereto, conductor means for connecting said current supply means to said electrode and to the workpiece for applying current through the arc therebetween, and circuit means coupling said sensing means to said current supply means for applying said controlling voltage to said current supply means to thereby control the current through the arc.

6. A welding control system including in combination, a welding electrode for producing a welding arc between said electrode and a workpiece, current supply means for producing welding current and including control means for controlling the value of the welding current in accordance with a control voltage applied thereto, conductor means for connecting said current supply means to said electrode and to the workpiece for applying current through the welding arc therebetween, support means for said electrode for holding the same at a controlled distance from the workpiece, position sensing means coupled to said electrode and producing a position voltage which varies with the distance of the electrode from the workpiece, transducer means for producing a reference voltage and for producing an error voltage in accordance with the variation of said position voltage from said reference voltage, and circuit means coupling said sensing means to said current supply means for applying said error voltage to said control means thereof to thereby control the current through the welding arc.

7. A welding control system including in combination, a welding torch having an electrode for producing a welding arc with a workpiece, current supply means for producing welding current and including control means for controlling the value of the welding current in accordance with a control voltage applied thereto, conductor means for connecting said current supply means to said electrode and to the workpiece for applying current through the welding arc therebetween, support means for said welding torch for holding said electrode at a control distance from the workpiece, position sensing means including follower means movably supported on said welding torch and having a portion held in engagement with the workpiece, pick up means coupled to said follower means and producing a position voltage which varies with the distance of the electrode from the workpiece, and transducer means for producing a reference voltage and for producing an error voltage in accordance with the variation of said position voltage from said reference voltage, and circuit means coupling said sensing means to said current supply means for applying said error voltage to said control means thereof to thereby control the current through the welding arc.

8. A welding control system including in combination, a welding electrode for producing an arc with a workpiece, current supply means for producing welding current of a value which varies with the control voltage applied thereto, conductor means for connecting said current supply means to said electrode and to the workpiece for applying current through the arc therebetween, automatic support means for said electrode for positioning the same with respect to the workpiece, said automatic means including motor means for moving said electrode and control means responsive to the arc voltage between said electrode and the workpiece for operating said motor means so that said voltage remains substantially constant, position sensing means responsive to the distance of the electrode from the workpiece for providing a controlling voltage, and circuit means coupling said sensing means to said current supply means for applying said controlling voltage to said current supply means to thereby control the current through the arc.

9. A welding control system including in combination, a welding electrode for producing a welding arc between said electrode and a workpiece, current supply means for producing welding current, conductor means for connecting said current supply means to said electrode and to the workpiece for applying current through the arc therebetween, automatic support means for said electrode for positioning the same with respect to the workpiece, said automatic support means including motor means for moving said electrode and control means for operating said motor means in accordance with the voltage across the welding arc and a control voltage applied to said control means, position sensing means responsive to the distance of the electrode from the workpiece for providing a controlling voltage, and circuit means coupling said sensing means to said control means for applying said controlling voltage thereto.

10. A welding control system including in combination, a welding electrode for producing a welding arc between said electrode and a workpiece, current supply means for producing welding current, conductor means for connecting said current supply means to said electrode and to the workpiece for applying current through the arc therebetween, automatic support means for said electrode for positioning the same with respect to the workpiece, said automatic support means including motor means for moving said electrode and control means for operating said motor means and responsive to the arc voltage across the welding arc and a control voltage applied to said control means, position sensing means responsive to the distance of the electrode from the workpiece for providing a position voltage, and circuit means coupling said sensing means to said control means for applying said position voltage thereto, said control means causing operation of said motor means to position said electrode in accordance with the relation of said arc voltage to said position.

11. A welding control system including in combination, a welding torch having an electrode for producing a welding arc between said electrode and a workpiece, current supply means for producing welding current, conductor means for connecting said current supply means to said electrode and to the workpiece for applying current through the arc therebetween, automatic support means for said welding torch for positioning said electrode with respect to the workpiece, said automatic support means including motor means for moving said electrode and control means for operating said motor means in accordance with the voltage across the welding arc and a control voltage applied to said control means, position sensing means for producing a position voltage in response to movement of said electrode with respect to the workpiece, and transducer means for producing an error voltage in response to variation of said position voltage from a reference voltage, and circuit means coupling said sensing means to said control means for applying said error voltage thereto.

12. A welding control system including in combination, a welding torch having an electrode for producing a welding arc between said electrode and a workpiece, current supply means for producing welding current, conductor means for connecting said current supply means to said electrode and to the workpiece for applying current through the arc therebetween, automatic support means for said welding torch for positioning said electrode with respect to the workpiece, said automatic support means including motor means for moving said electrode and control means for operating said motor means in accordance with the voltage across the welding arc and a control voltage applied to said control means, position sensing means including follower means movably supported on said welding torch and having a portion held in engagement with the workpiece, pick up means coupled to said follower means for producing a position voltage in response to movement of said follower means with respect to said welding torch, and transducer means for producing an error voltage in response to variation of said position voltage from a reference voltage, and circuit means coupling said sensing means to said control means for applying said error voltage thereto.

13. A welding control system including in combination, a welding electrode for producing an arc with a workpiece, support means for said electrode operable in response to a control voltage for positioning said electrode with respect to the workpiece, position sensing means coupled to said electrode and responsive to the distance of the electrode from the workpiece for producing a first control voltage, current supply means for supplying welding current of a value which varies with the control voltage applied thereto, conductor means for connecting said current supply means to said electrode and to the workpiece for applying welding current thereto, circuit means coupling said sensing means to said current supply means for applying said first control voltage to said current supply means to thereby control the welding current, current sensing means connected to said current supply means for producing a second control voltage which varies with variations in the welding current, and control means coupled to said current sensing means and to said support means for applying said second control voltage to said support means to thereby control the position of said electrode.

14. A welding control system including in combination, a welding electrode for producing a welding arc with a workpiece, signal controlled support means for said electrode for positioning the same with respect to the workpiece, position sensing means coupled to said electrode and responsive to the distance of the electrode from the workpiece for producing a first control voltage, current supply means for supplying welding current of a value which varies with the control voltage applied thereto, conductor means for connecting said current supply means to said electrode and to the workpiece for applying welding current through an arc therebetween, circuit means coupling said sensing means to said current supply means for applying said first control voltage to said current supply means to thereby control the welding current, current sensing means connected to said current supply means for producing a second control voltage varying with the welding current, and control means coupled to said current sensing means and to said support means for applying said second control voltage thereto, said second control voltage causing said support means to move said electrode closer to said workpiece in response to increase in the welding current.

15. A welding control system including a combination, a welding torch having an electrode for producing a welding arc with a workpiece, current supply means for supplying welding current and controlling the value of the welding current in accordance with a control voltage applied thereto, conductor means for connecting said current supply means to said electrode and to the workpiece for applying current through the welding arc therebetween, support means for said welding torch operable in response to a control signal for positioning said electrode at a controlled distance from the workpiece, position sensing means coupled to said welding torch and producing a position voltage which varies with the distance of the electrode from the workpiece, transducer means coupled to said position sensing means and producing an error voltage in accordance with the variation of said position voltage from a reference voltage, circuit means coupling said transducer means to said current supply means for applying said error voltage thereto to thereby control the current through the welding arc, current sensing means connected to said current supply means for producing a control signal which varies with changes in the welding current, and control means coupled to said current sensing means and to said support means for applying said control signal thereto, said control signal causing said support means to position said electrode closer to said workpiece in response to increase in the welding current.

16. A welding control system including in combination, a welding torch having an electrode for producing a welding arc with a workpiece, current supply means for supplying welding current and controlling the value of the welding current in accordance with a control voltage applied thereto, conductor means for connecting said current supply means to said electrode and to the workpiece for applying current through the welding arc therebetween, support means for said welding torch operable in response to a control signal for positioning said electrode at a controlled distance from the workpiece, position sensing means including follower means movably supported on said welding torch and having a portion held in engagement with the workpiece, pick up means coupled to said follower means and producing a position voltage which varies with the distance of the electrode from the workpiece, and transducer means including means producing a reference voltage, said transducer means being coupled to said pick up means and producing an error voltage in accordance with the variation of said position voltage from said reference voltage, circuit means coupling said transducer means to said current supply means for applying said error voltage thereto to thereby control the current through the welding arc, current sensing means connected to said current supply means for producing a control signal which varies with the welding current, and control means coupled to said current sensing means and to said support means for applying said control signal to said support means to thereby control the position of said electrode.

17. A welding control system including in combination, a welding electrode for producing a welding arc with a workpiece, current supply means for supplying welding current and including first control means for controlling the welding current in accordance with a control voltage applied thereto, conductor means for connecting said current supply means to said welding electrode and to the workpiece for applying welding current through the welding arc therebetween, support means for said electrode including second control means operative to position said electrode in accordance with a control voltage applied thereto to control the length of the welding arc, means for moving said workpiece with respect to said electrode including third control means for controlling the speed of such movement in accordance with a control voltage applied thereto to thereby control the welding speed, sensing means including a portion responsive to the distance of the electrode from the workpiece for providing a control voltage, and circuit means coupled to said sensing means and to at least one of said control means for applying said control voltage from said sensing means thereto for operating the same.

18. A welding control system including in combination, a welding electrode for producing a welding arc with a workpiece, current supply means for supplying welding current and including first control means for controlling the welding current in accordance with a control voltage applied thereto, conductor means for connecting said current supply means to said welding electrode and to the workpiece for applying welding current through the welding arc therebetween, support means for said electrode including second control means operative to position said electrode with respect to the workpiece in accordance with a control voltage applied thereto to thereby control the length of the welding arc, motor operated means for supporting the workpiece and for moving the same with respect to said electrode, said motor operated means including third control means for controlling the speed of relative movement between the workpiece and said electrode in accordance with a control voltage applied thereto to thereby control the welding speed, sensing means including a portion responsive to the distance of the electrode from the workpiece for providing a control voltage, and circuit means coupled to said sensing means and to at least one of said control means for applying with said control voltage from said sensing means to said one control means for operating the same.

19. A welding control system including in combination, a welding electrode for producing a welding arc with a workpiece, current supply means for supplying welding current, conductor means for connecting said current supply means to said welding electrode and to the workpiece for applying welding current through the welding arc therebetween, support means for said electrode for positioning the same with respect to the workpiece, means for providing relative movement between the workpiece and said electrode including control means for controlling the speed of such movement in accordance with a control voltage applied thereto to thereby control the welding speed, sensing means including a portion responsive to the distance of the electrode from the workpiece for providing a control voltage, and circuit means coupled to said sensing means and to said control means for applying said control voltage from said sensing means to said control means for operating the same.

20. A welding control system including in combination, a welding electrode for producing a welding arc with a workpiece, current supply means for supplying welding current, conductor means for connecting said current supply means to said welding electrode and to the workpiece for applying welding current through the welding arc therebetween, support means for said electrode for positioning the same with respect to the workpiece, motor operated means for supporting the workpiece and for providing relative movement between the workpiece and said electrode, said motor operated means including control means for controlling the speed of relative movement between the workpiece and said electrode in accordance with a control voltage applied thereto to thereby control the welding speed, sensing means including a portion responsive to the distance of the electrode from the workpiece for providing a control voltage, and circuit means coupled to said sensing means and to said control means for applying said control voltage from said sensing means to said control means for controlling the speed of relative movement between the workpiece and said electrode.

References Cited by the Examiner

UNITED STATES PATENTS 2,832,000  4/1958  Steele _______________ 314—69

ANTHONY BARTIS, *Acting Primary Examiner.*

RICHARD M. WOOD, *Examiner.*